(12) United States Patent
Baehrle-Miller et al.

(10) Patent No.: US 8,521,388 B2
(45) Date of Patent: Aug. 27, 2013

(54) METHOD FOR SETTING THE CLAMPING FORCE EXERTED BY A PARKING BRAKE

(75) Inventors: Frank Baehrle-Miller, Schoenaich (DE); Dieter Blattert, Kirchheim/Neckar (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 13/065,007

(22) Filed: Mar. 10, 2011

(65) Prior Publication Data

US 2011/0224880 A1    Sep. 15, 2011

(30) Foreign Application Priority Data

Mar. 12, 2010   (DE) .......................... 10 2010 002 825

(51) Int. Cl.
*G06G 7/76*    (2006.01)

(52) U.S. Cl.
USPC .......................................................... 701/70

(58) Field of Classification Search
USPC .......................................................... 701/70
See application file for complete search history.

(56) References Cited

U.S. PATENT DOCUMENTS

| | | | | |
|---|---|---|---|---|
| 6,425,643 B2 * | 7/2002 | Shirai et al. | ................... | 303/112 |
| 6,728,614 B2 * | 4/2004 | Matsubara et al. | ............. | 701/36 |
| 6,813,553 B2 * | 11/2004 | Nakamura et al. | .............. | 701/70 |
| 7,121,633 B2 * | 10/2006 | Tachiiri et al. | ................... | 303/20 |
| 7,143,873 B2 * | 12/2006 | Pascucci et al. | ............. | 188/72.7 |
| 7,837,278 B2 * | 11/2010 | Nilsson | ............................ | 303/20 |
| 7,992,691 B2 * | 8/2011 | Maron et al. | .................. | 188/156 |
| 8,185,287 B2 * | 5/2012 | Maron et al. | ..................... | 701/70 |
| 8,296,029 B2 * | 10/2012 | Watanabe et al. | ............... | 701/70 |
| 2001/0033106 A1 * | 10/2001 | Shirai et al. | .................... | 303/177 |
| 2008/0091309 A1 * | 4/2008 | Walker | ............................... | 701/1 |
| 2009/0099748 A1 * | 4/2009 | Watanabe et al. | ............... | 701/70 |
| 2011/0278105 A1 * | 11/2011 | Maron et al. | .................. | 188/72.1 |

* cited by examiner

*Primary Examiner* — Thomas Tarcza
*Assistant Examiner* — Alex C Dunn
(74) *Attorney, Agent, or Firm* — Kenyon & Kenyon LLP

(57) ABSTRACT

In a method for setting the clamping force exerted by a parking brake, which force is applied by an electric motor-based braking apparatus and, if necessary, by an additional braking apparatus, during an actuation phase of the electric motor-based braking apparatus, the motor resistance and the motor constant are determined from the present motor voltage, the present motor current, and the present motor rotation speed, and the clamping force achievable by the electric motor-based braking apparatus is ascertained therefrom. If the electric motor-based braking force does not reach a required target clamping force, an additional braking force is generated by the additional braking apparatus.

10 Claims, 3 Drawing Sheets

METHOD FOR SETTING THE CLAMPING FORCE EXERTED BY A PARKING BRAKE

BACKGROUND OF THE INVENTION

1. Field of the Invention

The present invention relates to a method for setting the clamping force exerted by a parking brake.

2. Description of Related Art

Automatic parking brakes (APBs), with which a braking force is continuously exerted in a vehicle while it is stationary, are known. The parking brake is locked, and released again, by way of an actuation element in the vehicle; the actuation generated by the driver results, in a closed- or open-loop control device, in an actuating signal with which control is applied to a braking apparatus, for example an electric motor or a hydraulic pump, to generate braking force at the wheels of the vehicle. Electric motor-based braking apparatuses encompass an electric motor that is disposed on the brake caliper and that acts via a linkage, for example a step-down linkage having a spindle drive, directly on the brake cylinder of the hydraulic brake system. The electric motors are dimensioned so that with them alone, it is possible to set a clamping force with which a vehicle can be held in energyless fashion on 20% slopes. In the case of electric motors of smaller dimensions, or a smaller linkage step-down ratio, the hydraulic braking apparatus is additionally actuated in order to increase the clamping force to the necessary value.

BRIEF SUMMARY OF THE INVENTION

An object of the present invention is to make the requisite clamping force available in a parking brake in reliable and at the same time economical fashion.

The method according to the present invention refers to the setting of a clamping force exerted by a parking brake in a vehicle, such that the parking brake encompasses an electric motor-based braking apparatus and moreover an additional braking apparatus, and a portion of the total clamping force can be generated by each of the two braking apparatuses, the magnitude of the respective portion being modifiably settable between zero and a maximum value. It is thus possible in particular to apply the requisite clamping force exclusively via the electric motor-based braking apparatus, provided it is capable thereof based on its dimensions and the prevailing boundary conditions and ambient conditions. The clamping force portion that is generated via the additional braking apparatus accordingly fluctuates between zero and a maximum value.

With the method according to the present invention, during an actuation phase of the electric motor-based braking apparatus, the motor resistance and the motor constant are determined from the present motor voltage, the present motor current, and the present motor rotation speed; and the clamping force achievable by way of the electric motor-based braking apparatus is ascertained therefrom. The magnitude of the electric motor-based clamping force that can be generated in the instantaneous situation is thus directly identified, which force depends on a variety of parameters or characteristic values or state values, e.g. the temperature in the braking system or in the electric motor-based braking apparatus. Other influencing variables are also sensed directly by way of the magnitude of the maximum attainable electric motor-based clamping force, for example aging in the electric motor. The presently achievable clamping force that is maximally attainable by way of the electric motor-based braking apparatus fluctuates as a result of such influencing variables; the maximum value of the electric motor-based clamping force can be ascertained from the aforesaid measurable or determinable variables.

If it is ascertained that the electric motor-based clamping force alone is not sufficient to establish the requisite target clamping force, the additional braking apparatus is actuated and generates an additional braking force that is superimposed on the electric motor-based clamping force. As a rule, the electric motor-based clamping force and the additional force add to one another; instead of a linear superimposition, a nonlinear superimposition is also a possibility. Because the maximum electric motor-based clamping force can be ascertained with comparatively high accuracy, the additional braking force can also be set with a correspondingly high accuracy in order to attain the target clamping force, so that no, or only a slight, excess of braking force is generated and, correspondingly, only the minimum energy output necessary for the clamping force needs to be generated. Economical operation can thereby be implemented.

Also possible, in addition to this, is an operating mode having an adjustable ratio between electric motor-based braking force and additional braking force, which ratio is oriented not toward the maximum value of the presently attainable electric motor-based braking force but toward other criteria, for example reducing stress on the electric motor. For example, an electric motor-based braking force can be set that is below the maximum settable value, and a correspondingly greater portion can be generated by way of the additional braking apparatus.

The electric additional braking apparatus is in particular a hydraulic braking apparatus, either the hydraulic vehicle brake that has control applied to it by way of actuating signals of a closed- or open-loop control device, or an additionally provided hydraulic braking apparatus. Also possible in principle, however, are other additional braking apparatuses, for example pneumatic or electrically actuable additional braking apparatuses such as electric motors or other electrical actuators.

According to a useful embodiment, provision is made that the achievable electric motor-based clamping force is calculated as a function of the electric motor-based motor torque, which is determined from the present values for motor voltage, motor current, and motor rotation speed, and as a function of the motor resistance and motor constant. The motor constant and motor resistance are in turn determined, based on correlations known per se, from the present values for motor voltage, motor current, and motor rotation speed, which preferably are determined during motor ramp-up directly after the motor is started. The phase during which the motor resistance and motor constant are ascertained refers, for example, to the time period from 5 to 7 tau, 1 tau being the mechanical time constant after which the motor has reached approximately 63% of its final speed. Motor ramp-up is usually almost complete (99.3%) after 5 tau.

If applicable, a shorter consideration time period of, for example, 3 tau is also sufficient, if lower estimation accuracy can be accepted.

It is useful also to incorporate into the determination of the motor torque, which is the basis for calculating the electric motor-based clamping force, the idle torque of the motor; this is ascertained, during an idle phase of the electric motor-based braking apparatus, from the associated idle current. It is moreover useful to take into account, in the context of the electric motor-based clamping force, not only the motor torque but also the linkage step-up ratio with which the motor motion is transferred to the brake calipers of the wheel brakes, as well as the efficiency of the step-down linkage.

Using the method according to the present invention, the current of the electric motor-based braking apparatus can be regulated to an at least approximately constant value, for example in such a way that the attainable electric motor-based clamping force has associated with it a lead current to which regulation occurs, the difference with respect to the target clamping force being generated by way of the additional braking force of the additional braking apparatus. Instead of the lead current, a variable derivable therefrom can also be employed as a lead variable for closed-loop control, for example the lead speed of the electric motor, which speed is inversely proportional to the lead current.

The method preferably executes in a closed- or open-loop control device in which measured variables, in particular electric motor-based measured variables, are processed, and actuating signals for setting the various components of the parking brake are generated therefrom. The closed- or open-loop control device either is a constituent of the parking brake in a vehicle or communicates with the parking brake.

DETAILED DESCRIPTION OF THE INVENTION

Figure 1:
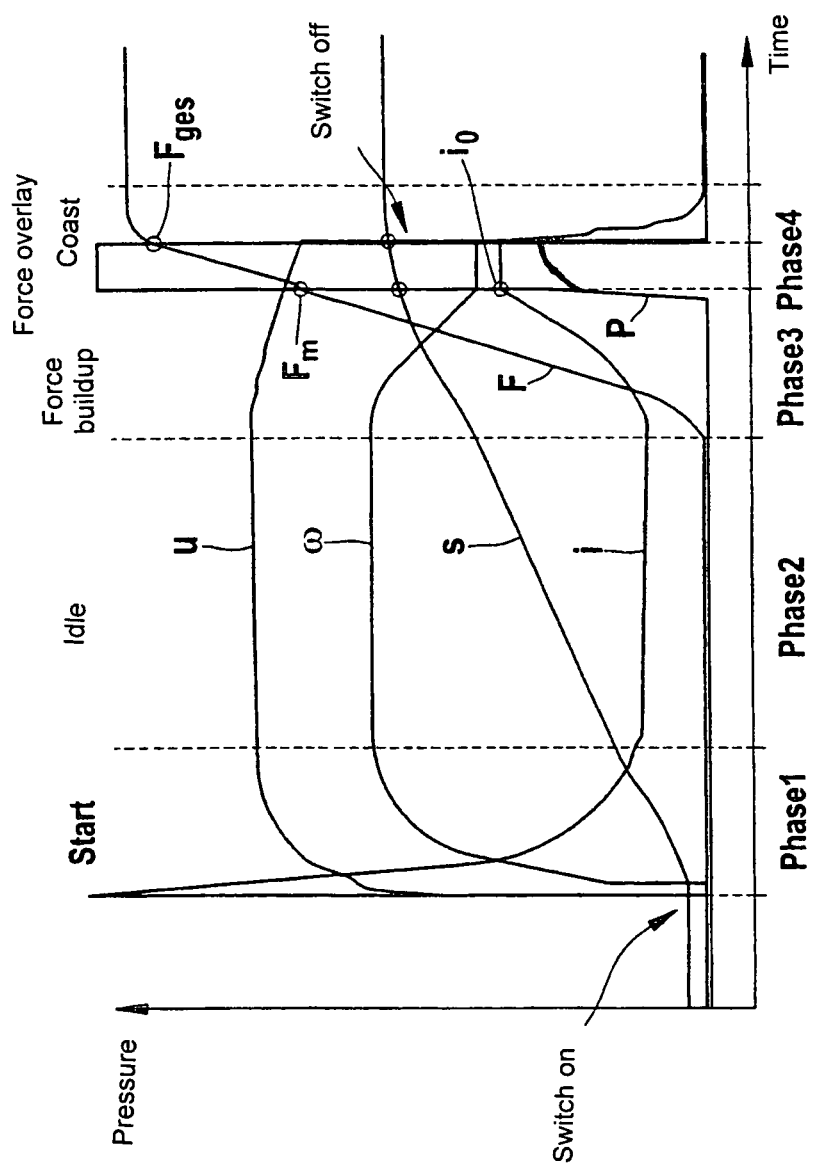
FIG. 1 shows the change over time in various operating variables of a parking brake in the context of a brake application operation.

FIG. 1 shows the change over time in various operating variables of a parking brake in the context of a brake application operation. The application operation can be subdivided substantially into four phases:

At the beginning of a phase 1, an application request is detected and electric motor 1 installed on the wheel brake is switched on. A switch-on current peak is visible as electric motor 1 is switched on. The current i of electric motor 1 then subsequently drops until, at the end of phase 1, an idle current is established. The rotation speed $\omega$ of electric motor 1 rises in phase 1, i.e. electric motor 1 is accelerated. At the end of phase 1, the rotation speed $\omega$ of electric motor 1 reaches an idle rotation speed. The voltage u of electric motor likewise rises. At the end of phase 1 an idle voltage is established. As a result of the rotation of a spindle, a nut is moved toward a brake piston of the wheel brake, Because the nut is not yet in contact with the piston base, the clamping force F is equal to zero. The pressure p of hydraulic pump 7 is likewise zero in this phase.

Phase 2 is an idle phase in which an idle current, an idle voltage, and an idle rotation speed are established. The clamping force of the wheel brake continues to be zero in this phase, since the nut is not yet in contact with the piston base. The pressure p of hydraulic pump 7 continues to be equal to zero.

In phase 3, force buildup occurs. The nut is in contact with the piston base, and the piston is pressed against the brake disk by the rotation of the spindle; the current i of electric motor 1 rises. Because of the load on electric motor 1, in this phase the voltage u of electric motor 1 drops slightly from the idle voltage level. The rotation speed $\omega$ of electric motor 1 likewise drops with increasing clamping force buildup. Shortly before a predetermined target clamping force $F_m$ is reached, hydraulic pump 7 is brought on-line and a hydraulic pressure p is thus built up. The target clamping force $F_m$ can have, for example, a value that is close to the maximum clamping force of electric motor 1.

Phase 4 begins when the target clamping force $F_m$ is reached. In this phase, both braking systems are active and electric motor 1 is being assisted by hydraulic pump 7. The total clamping force in this context is made up of a portion from electric motor 1 and a portion from hydraulic pump 7. In phase 4, the current $i_o$ of electric motor 1 is regulated to a substantially constant value. The hydraulic pressure p rises until a predetermined total clamping force is reached. After that, electric motor 1 and the pump motor of the hydraulic braking apparatus are switched off. As a consequence thereof, the hydraulic pressure p, current i, voltage u, and rotation speed $\omega$ of electric motor 1 drop to zero. The total clamping force $F_{ges}$ is maintained in this context.

Figure 2:
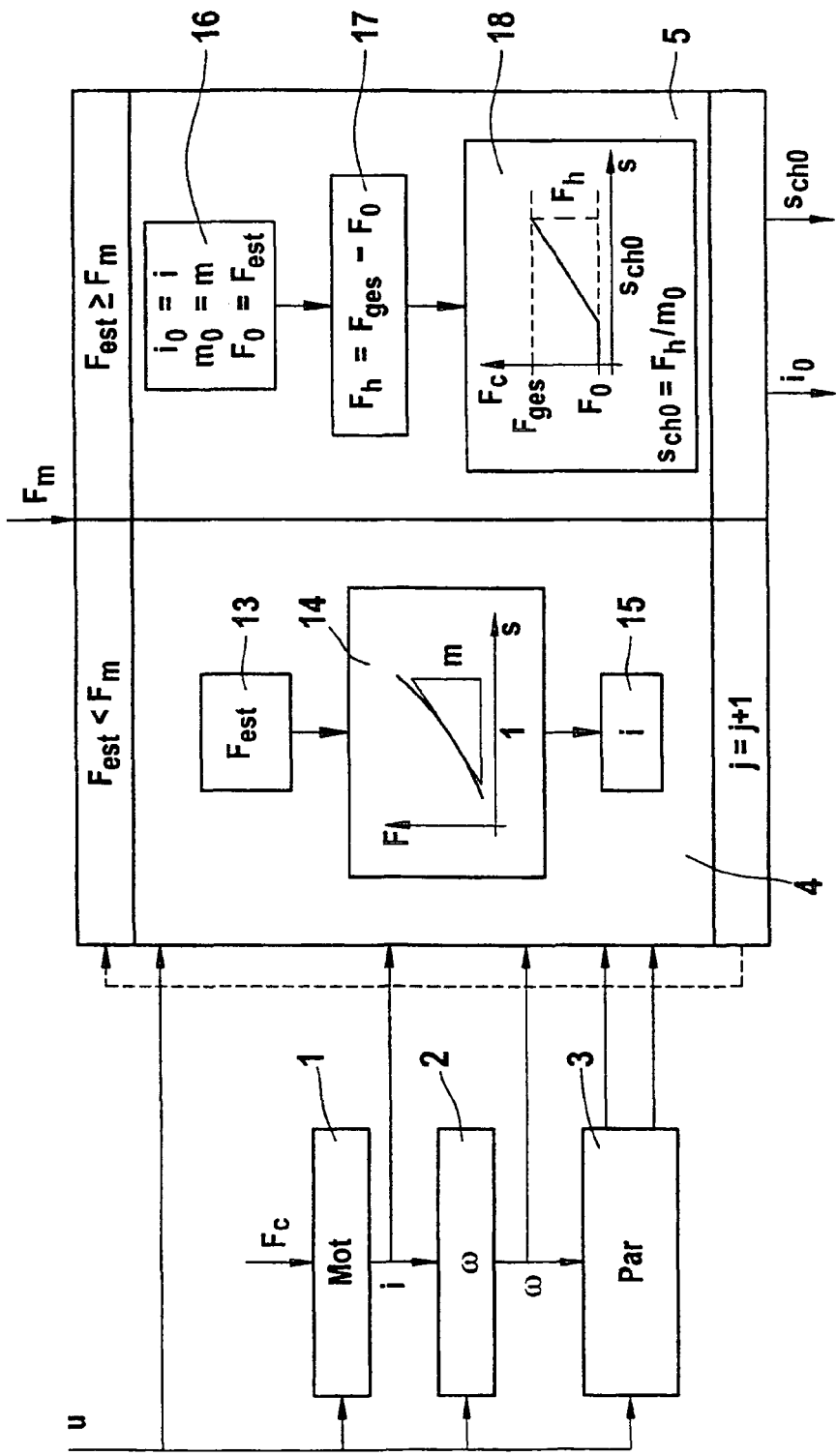
FIG. 2 schematically depicts the calculation of a reference distance ($s_{ch0}$) to be traveled by the brake piston.

FIG. 2 schematically depicts the calculation of a reference distance ($s_{ch0}$) to be traveled by the brake piston. The reference distance is the distance that is still to be traveled by the piston, after the target braking force $F_m$ is reached, in order to reach a specific total clamping force.

In the exemplifying embodiment depicted, the actual motor torque is estimated from the measured current value i, a rotation speed $\omega$ (block 2) estimated from the current i, and further motor parameters (block 3) such as, for example, a present motor constant $k_M$ and a motor resistance $R_M$. If the step-down ratio of the linkage and the efficiencies of the mechanical chain are known, the instantaneous clamping force $F_{est}$ can thus be estimated in step 13. A suitable iterative algorithm 4 is provided for this purpose. This algorithm 4 additionally calculates, in step 14, the slope m of the clamping force over the distance s.

As soon as the estimated clamping force has reached the value of the target clamping force $F_m$, the present current value is stored in step 15, and in step 16 is outputted as a setpoint $i_0$ for closed-loop current control. When the target clamping force $F_m$ is reached in step 16 the present slope $m=m_0$ and the present clamping force $F_{est}=F_0=F_m$ are also saved. From the slope m and the desired total clamping force $F_{ges}$, i the reference distance $S_{ch0}$ that the piston must still travel in order to reach the desired total clamping force is then calculated n steps 17 and 18. The reference distance $S_{ch0}$ is obtained in step 18 from a calculation $S_{ch0}=(F_{ges}-F_m)/m=F_h/m$, where $F_{ges}$ is the desired total clamping force, $F_m$ the target clamping force of the electromechanical braking apparatus, $F_h$ the hydraulically generated additional braking force constituting the difference between the total clamping force $F_{ges}$ and the electromechanical target clamping force $F_m$, and m the slope of the force increase over the distance s traveled by the piston.

Figure 3:
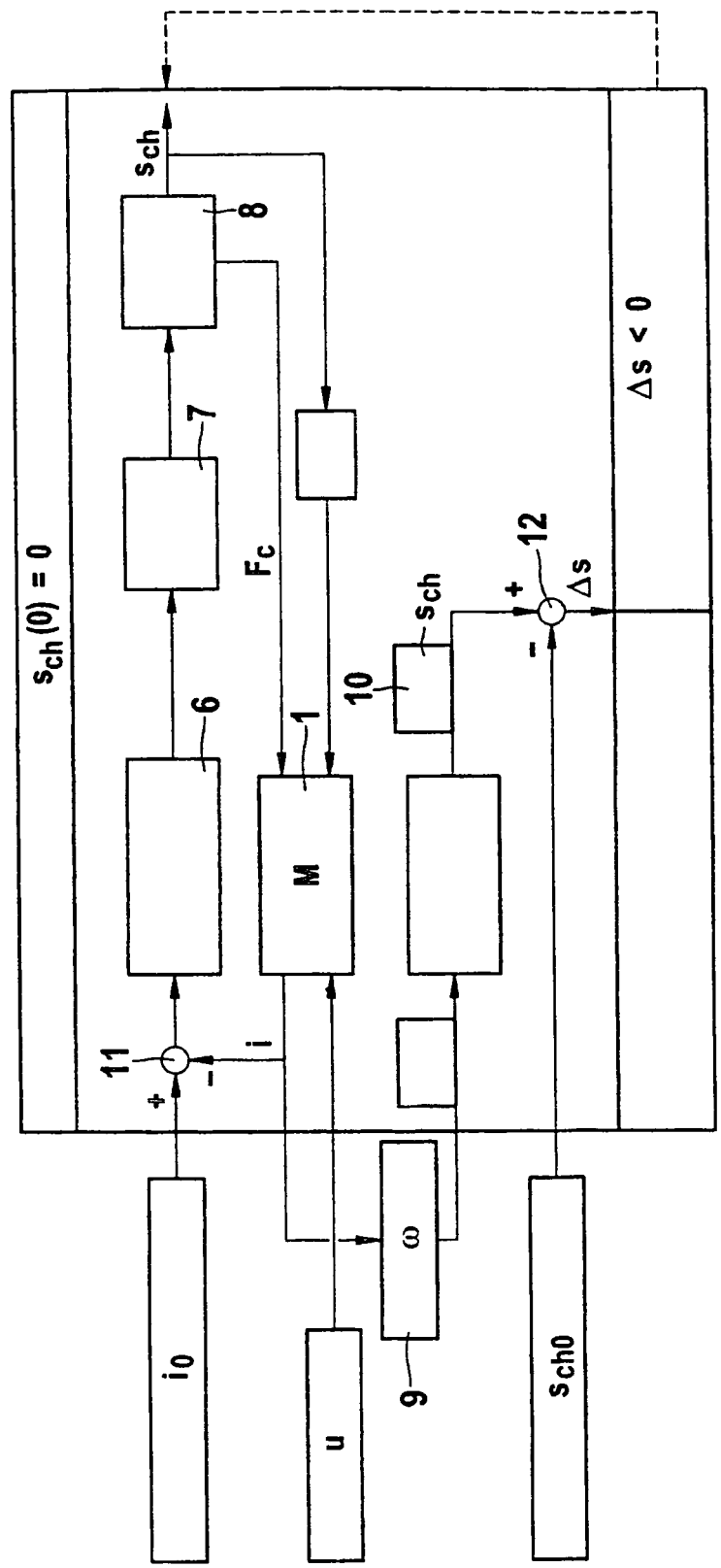
FIG. 3 schematically depicts a motor current control operation.

FIG. 3 schematically depicts a motor current control operation in which the pump motor of the hydraulic braking apparatus is used as an actuating member. By varying the hydraulic pressure it is possible to relieve the load on electric motor 1 of the parking brake to a greater or lesser extent. The drive torque of electric motor 1, and thus also the power consumption, can thereby be held to a substantially constant value.

The closed-loop control system encompasses a node 11 at which the system deviation ($i_0-i$), or alternatively ($\omega_0-\omega$), is calculated. This difference is delivered to a controller 6 (pump motor control system) that outputs a specific manipulated variable depending on the control algorithm. In the present example, pump motor 7 of the hydraulic pump constitutes the actuating member of the closed-loop control system. The controlled system further encompasses brake caliper 8 and electric motor 1. A specific current of electric motor 1 is thereby established depending on the degree of hydraulic assistance.

In block 9, the rotation speed ω of electric motor 1 is also estimated from current i. Using the estimated rotation speed value, the distance $s_{ch}$ traveled by the brake piston can then be calculated (block 10). The desired total clamping force is reached when the distance $s_{ch}$ traveled by the brake piston is equal to the reference distance $s_{ch0}$. To check this, a difference value Δs between the actual and reference distance is continuously calculated at a further node 12. As soon as the difference value is equal to zero, electric motor 1 and pump motor 7 are automatically switched off.

The electric motor-based parking brake is preferably hydraulically assisted only in those situations in which it is necessary for proper operation, for example when the slope of the road is greater than a specific value, e.g. 15%, or when a determination is made that the purely electric motor-based clamping force that is made available is not alone sufficient for reasons of voltage or temperature. As long as the driver remains in the vehicle and the slope is, for example, less than 15%, the hydraulic system will preferably not be brought online.

The electric motor-based parking brake could, however, also be designed in such a way that the clamping force is sufficient to hold the vehicle stationary, for example, on slopes of up to 20%. The hydraulic assistance would in this case be brought online only if the slope is, for example, greater than 20%, or if a braking force reserve needs to be provided, for example when the brakes are hot.

A description will be given below of the control application strategy for applying control to the parking brake, which is made up of the electric motor-based braking apparatus and the additional braking apparatus that is preferably embodied hydraulically. The sequence is divided into the four above-described phases of motor startup, the idle phase, force buildup, and the overlay of electric motor-based braking force and additional braking force.

During phase 1 (motor start with motor run-up), the present motor constant $k_M$ and the present motor resistance $R_M$ are calculated, for example using iterative estimation methods. The calculated motor resistance $R_M$ is used to determine the minimum current required to reach the parking clamping force at the present voltage.

During the idle phase (phase 2), an idle current $I_{idle}$ is established which is an indication of the idle torque $M_{idle}$ of the motor. In the force buildup phase (phase 3)—making use of the motor constant $k_M$ and motor resistance $R_M$ parameters ascertained in the preceding phases as well as the idle torque $M_{idle}$ of the motor and the present values for current I, voltage U, and rotation speed ω—the actual motor torque $M_{Mot}$ is estimated using a mechanical and electrical motor differential equation:

$$M_{Mot}=f(U,I,\omega,k_M,R_M,M_{idle}).$$

The spring stiffness of the brake caliper is also ascertained in phase 3, the increase in clamping force being evaluated by comparison with the distance traveled.

If the voltage is insufficient or in the case of a very hot electric motor, a situation may occur in which the required clamping force cannot be made available in exclusively electromechanical fashion. In this case, in phase 3 there is an electromechanical application of a clamping force that is obtained from a modified lead current $I_{Lead}$ or a variable derivable therefrom, for example a lead rotation speed $\omega_{Lead}$ of the electric motor. The lead current is defined in this context, independently of the gradient, at a value which is less than the lead current that would theoretically be necessary in order to achieve the required clamping force by way of the electric motor-based braking apparatus; a prefactor that contains measurement inaccuracies and safety margins can additionally be taken into account.

If the lead current $I_{Lead}$ or modified lead current results in an electric motor-based clamping force that is too low to establish the required target clamping force $F_{ges}$, then in phase 4 (superposition) the additional braking force $F_h$ of the additional braking apparatus is overlaid. The present braking force F, which takes into account both the electric motor-based portion and the hydraulic portion, is calculated here from the instantaneous electric motor-based clamping force $F_{est}$ in consideration of the mechanical efficiency, and the additive superposition of the hydraulic clamping force $F_h$ in consideration of the hydraulic efficiency. The electric motor-based clamping force $F_{est}$ is calculated as a function of the electric motor-based motor torque $M_{Mot}$, a linkage step-up ratio i, and the mechanical efficiency η:

$$F_{est}=f(M_{Mot},i,\eta).$$

The hydraulically provided clamping force $F_h$ is calculated from an additional spring distance that is traveled during superposition, and from the spring stiffness of the brake caliper, which is preferably ascertained in phase 3.

In summary, the hydraulic pressure assistance is carried out not in fixed fashion, but rather dynamically, as a function of the operating conditions of the electric motor-based braking apparatus and the vehicle electrical system. If applicable, phase 4 begins at a point in time at which the rotation speed of the electric motor-based braking apparatus has fallen below a defined limit. This detects, independently of power demand, that the motor is being too severely braked and cannot make available the required torque.

Alternatively, phase 4 begins at a point in time when the electric motor-based clamping force exceeds the product of the motor constant and modified lead current. Also possible is a compensation of the two criteria, in particular such that the beginning of phase 4 occurs at a point in time at which one of the criteria is met.

What is claimed is:

1. A method for controlling a clamping force exerted by a parking brake, the clamping force being supplied by at least one of an electric motor-based braking apparatus and an additional braking apparatus, comprising:

determining, during an actuation phase of the electric motor-based braking apparatus, a motor resistance and a motor constant of the electric motor-based braking apparatus from a present motor voltage, a present motor current, and a present motor rotation speed of the electric motor-based braking apparatus;

ascertaining a maximum clamping force achievable by the electric motor-based braking apparatus based at least on the motor resistance and the motor constant; and generating an additional clamping force by the additional braking apparatus if the maximum clamping force achievable by the electric motor-based braking apparatus does not reach a predetermined target clamping force.

2. The method as recited in claim 1, wherein the maximum clamping force achievable by the electric motor-based braking apparatus is calculated as a function of at least a motor torque of the electric motor-based braking apparatus.

3. The method as recited in claim 2, wherein the motor torque of the electric motor-based braking apparatus is determined from the present motor voltage, the present motor current, the present motor rotation speed, the motor resistance and the motor constant of the electric motor-based braking apparatus.

4. The method as recited in claim 2, wherein during an idle phase of the electric motor-based braking apparatus, an idle torque is ascertained from an idle current, the idle torque being taken into account in calculating the motor torque of the electric motor-based braking apparatus.

5. The method as recited in claim 2, wherein the motor resistance and the motor constant are determined during motor run-up after the motor of the electric motor-based braking apparatus is started.

6. The method as recited in claim 2, wherein the current of the electric motor-based braking apparatus is regulated to approximately constant value.

7. The method as recited in claim 6, wherein the maximum clamping force achievable by the electric motor-based braking apparatus has one of an associated lead current or a magnitude derived from the associated current, and wherein the clamping force applied by the electric motor-based braking apparatus is controlled by controlling the one of the associated lead current or the magnitude derived from the associated current, and wherein a difference between the predetermined target clamping force and the maximum clamping force achievable by the electric motor-based braking apparatus is compensated by the additional clamping force generated by the additional braking apparatus.

8. The method as recited in claim 2, wherein the additional braking apparatus is a hydraulic braking apparatus generating hydraulic clamping force as the additional clamping force.

9. A control device for controlling a clamping force exerted by a parking brake, the clamping force being supplied by at least one of an electric motor-based braking apparatus and an additional braking apparatus, comprising:
  means for determining, during an actuation phase of the electric motor-based braking apparatus, a motor resistance and a motor constant of the electric motor-based braking apparatus from a present motor voltage, a present motor current, and a present motor rotation speed of the electric motor-based braking apparatus;
  means for ascertaining a maximum clamping force achievable by the electric motor-based braking apparatus based at least on the motor resistance and the motor constant; and
  means for generating an additional clamping force by the additional braking apparatus if the maximum clamping force achievable by the electric motor-based braking apparatus does not reach a predetermined target clamping force.

10. The control device as recited in claim 9, wherein the control device is one of a closed-loop or open-loop control device.

* * * * *